HIGH-EFFICIENCY TRANSLATING CIRCUIT

Filed Oct. 27, 1950 3 Sheets-Sheet 1

[PRIOR ART. DOHERTY PATENT 2210028]

INVENTOR
G. RAISBECK
BY Harry C. Hart
ATTORNEY

INVENTOR
G. RAISBECK
BY Harry C. Hart
ATTORNEY

INVENTOR
G. RAISBECK
BY Harry C. Hart
ATTORNEY

United States Patent Office 2,719,190
Patented Sept. 27, 1955

2,719,190

HIGH-EFFICIENCY TRANSLATING CIRCUIT

Gordon Raisbeck, Morristown, N. J., assignor to Bell Telephone Laboratories, Incorporated, New York, N. Y., a corporation of New York Application October 27, 1950, Serial No. 192,429

13 Claims. (Cl. 179—171)

This invention relates to signal translating circuits and particularly to translating circuits for electric signals.

A principal object of the invention is to translate signals, by amplification or modulation, with high efficiency and with a minimum of power dissipation. A related object is to remove the restriction to operation over a narrow frequency band which characterizes high efficiency amplifiers of a certain known construction.

A subordinate object is to provide an amplifier capable of being constructed in the form of an exceedingly compact packaged unit without risk of damage by reason of the heat generated in the dissipation of power.

Other objects of the invention will be apparent from the detailed description which follows.

In the well-known high efficiency amplifier of Doherty Patent 2,210,028 two paths are provided between a common source of modulated carrier waves and a common load, a first vacuum tube amplifier is connected in the first path and a second vacuum tube amplifier is connected in the second path. In one form of the apparatus the paths are in parallel and the first amplifier is biased for class B operation and the second is biased for class C operation. Between the class B amplifier and the load there is connected an impedance-inverting network, for example a quarter wavelength transmission line or its lumped circuit equivalent. Such a network has the property that its input impedance is inversely proportional to the impedance which terminates it. At low signal levels, only the class B amplifier operates. At high signal levels, the class C amplifier comes into operation and delivers power into the load. At the same time this operation causes an effective increase in the load impedance, which is converted by the impedance-inverting network into an apparent reduction in the load impedance as seen by the class B amplifier, so that the latter can then deliver an increase of power to the load without a corresponding increase in its anode voltage. The efficiency of the combination is known to be exceedingly high.

In a second form of the Doherty amplifier the load is connected in series between the two tubes and the impedance-inverting network is associated with the class C tube.

The reactive impedance-inverting network employed by Doherty introduces an unavoidable phase shift of 90 degrees, which requires compensation; and this compensation can only be achieved by the use of a second impedance-inverting network connected in the input circuit of one or other of the tubes, which second network introduces another 90 degree phase shift.

The Doherty amplifier is further described in an article entitled "A new high efficiency power amplifier for modulated waves," by W. H. Doherty, published in the Proceedings of the Institute of Radio Engineers for September 1936, and in the Acts of the International Congress for the Fiftieth Anniversary of Marconi's Discovery of Radio.

Now in the Doherty amplifier the combination of the two impedance-inverting networks and the vacuum tube amplifier between them may be regarded, at least over the narrow frequency band in which the networks accomplish the required impedance inversion, as the dual counterpart of a single vacuum tube amplifier; i. e., its input impedance is low, amplification is primarily of current rather than voltage, and its power output increases with an increase in its load resistance, the reverse being the case for the single vacuum tube. Consequently any other network or instrumentality having these properties is equivalent to the combination of Doherty's two impedance-inverting networks and can replace this combination, and would serve as well.

Bardeen-Brattain Patent 2,524,035 issued October 3, 1950, describes a new semiconductor amplifier which has come to be known as a transistor. In three pending applications for patent it is shown that the present day transistor is more nearly the dual counterpart of a vacuum tube than its analogue and that, when excellent performance is known to be obtainable from a particular circuit configuration of which a vacuum tube is a part, then comparable performance may be expected from a transistor circuit which is the dual counterpart of the known vacuum tube circuit, and of which the transistor, itself an approximate dual of the vacuum tube, forms a part. These applications are Serial No. 184,457, filed September 12, 1950, now Patent No. 2,652,460; Serial No. 184,458 filed September 12, 1950, now Patent No. 2,620,448; and Serial No. 184,459, filed September 12, 1950, now Patent No. 2,681,996.

Once it has been realized that the transistor by itself is a dual counterpart of the vacuum tube and that Doherty's combination of two impedance-inverting networks and a vacuum tube between them is also independently a dual counterpart of a vacuum tube it can be seen that a transistor is such an equivalent of the Doherty combination, and may be substituted for it. When this substitution has been made the result is a translating circuit having two paths leading from a common source to a common load, in one of which a transistor amplifier is connected while in the other a vacuum tube amplifier is connected, one of these amplifiers being biased for class B operation and the other being biased for class C operation. It has been found that the combination as a whole amplifies signals with high efficiency. Furthermore the present amplifier does not necessarily contain reactive circuit elements, so that it may be operated on a broad band basis, distortion being preferably minimized by the employment of a balanced transistor amplifier in the one path and a balanced vacuum tube amplifier in the other.

The invention will be illustrated in terms of preferred embodiments thereof employing transistors. It will be fully apprehended from the following detailed description of such embodiments, taken in conjunction with the drawings of which:

Fig. 1A is a schematic circuit diagram illustrating the amplifier of Doherty Patent 2,210,028 in one of its forms; while

Fig. 2A is a schematic circuit diagram showing a system derived from the system of Fig. 1A by substituting the combination of a transistor and a phase-reversing transformer for the combination of a vacuum tube and two impedance-inverting networks of Fig. 1A; while

Fig. 4 is a schematic circuit diagram derived from

Figure 3:
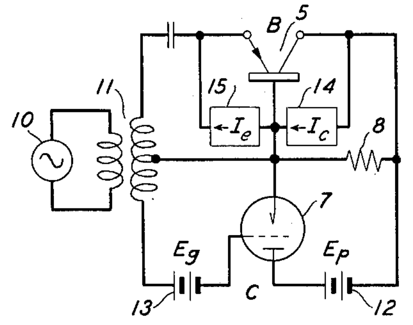
Fig. 3 is a schematic circuit diagram showing a system derived from that of Fig. 2A by substituting a phase reversal at the input terminals for the transformer of Fig. 2A, and by the addition of appropriate voltage bias sources for the vacuum tube amplifier and current bias sources for the transistor amplifier.
Figure 4:
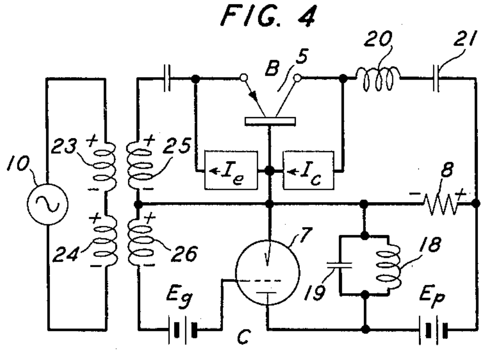
Figure 5A:
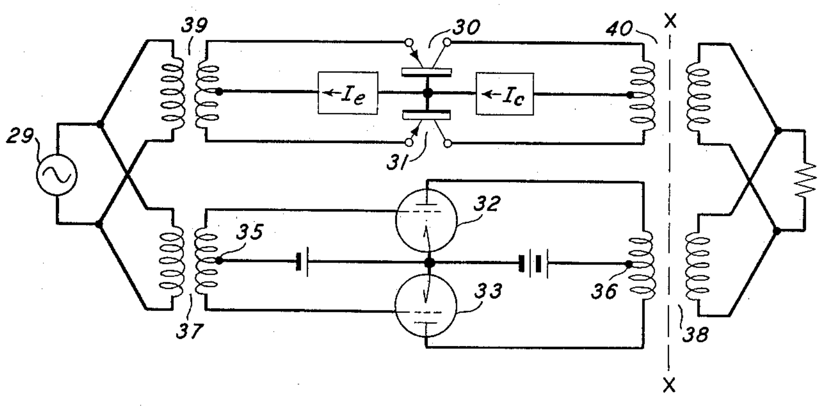
Figure 5B:
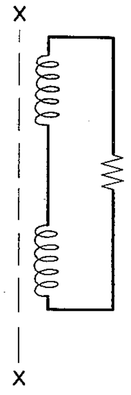
Figure 6:
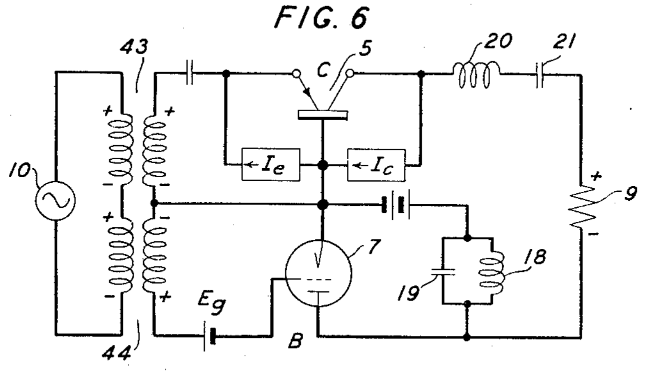
Figure 7:
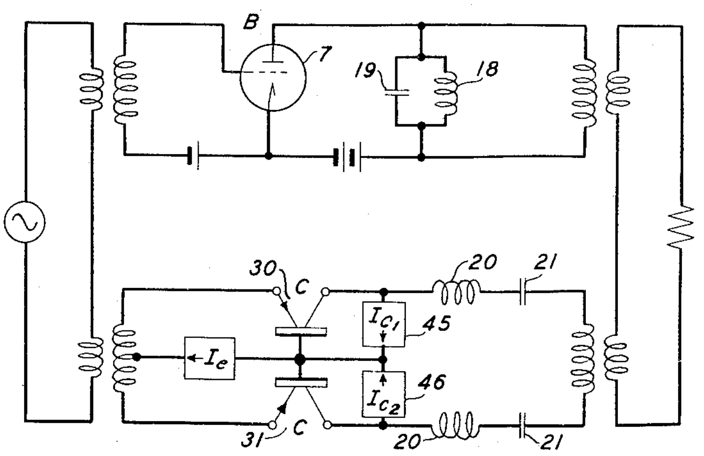

Fig. 3 by the addition of tuned circuits, for practical single frequency operation of the circuit of Fig. 3;

Fig. 5A is a schematic circuit diagram derived from Fig. 3 by the substitution of a balanced or push-pull vacuum tube amplifier and of a balanced or push-pull transistor amplifier for the unbalanced amplifiers of Fig. 3;

Fig. 6 is a schematic circuit diagram showing a translating circuit alternative to Fig. 4 in which the load is connected in series between the outputs of a vacuum tube and of a transistor, instead of in parallel with these outputs as in Fig. 4;

Fig. 5B shows a modification of Fig. 5A in which the load is connected in series between the outputs of the vacuum tubes and the outputs of the transistors, instead of being connected in parallel between these outputs;

Fig. 7 is a schematic diagram showing a push-pull pair of transistors in one path and a single-sided vacuum tube amplifier in the other.

Figure 10:
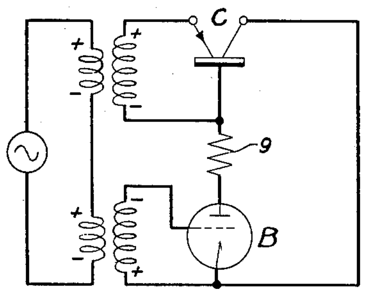
Figure 11:
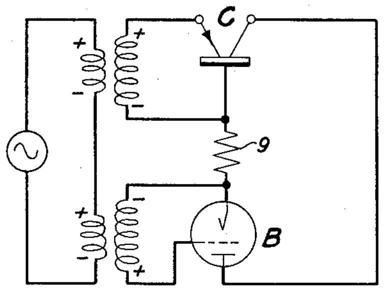
Figure 12:
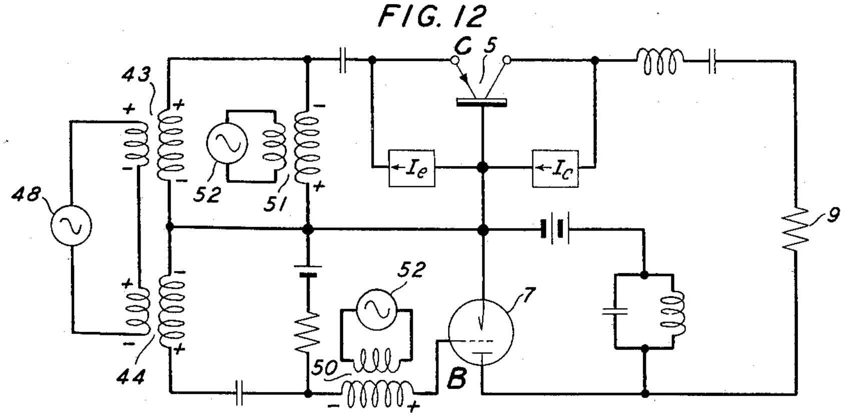

Figs. 8, 9, 10 and 11 are schematic diagrams illustrating various alternative ways of connecting the input and output circuit with respect to the transistor and the tube of Fig. 3; and Fig. 12 shows a tuned modulator which is an extension of the amplifier of Fig. 6 by the insertion at appropriate points of a modulating signal.

Figure 1A:
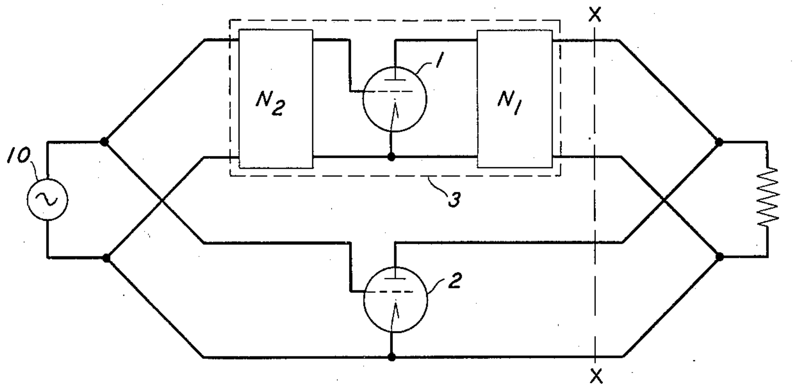
Figure 1B:
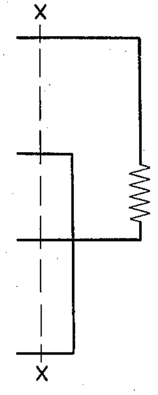
Fig. 1B illustrates the other form of the same Doherty amplifier.

Referring now to the drawings, Fig. 1A shows one principal form of the amplifier of Doherty Patent 2,210,028 wherein a source 10 of signal-modulated carrier waves is connected to a load by way of two paths. The upper path includes a vacuum tube which is biased for class B operation and two impedance-inverting networks $N_1$ and $N_2$. The lower path includes a second vacuum tube biased for class C operation. From the standpoint of the load, the output circuits of the two paths are in parallel. In the other principal form of the Doherty amplifier the load is in series between the two output circuits as indicated in Fig. 1B. When this change is made, the upper tube is to be adjusted for class C operation and the lower tube for class B operation.

The amplifier of Fig. 1A is particularly suited for use with amplitude-modulated radio frequency inputs. Its mode of operation is discussed in detail in the Doherty patent and publications above referred to and it may be summarized as follows:

For radio frequency inputs of small magnitude the upper tube works as a class B amplifier while the lower tube is biased well below its cut-off and is therefore inactive. When the amplitude of the modulated signal is less than the amplitude of the unmodulated carrier it is amplified by the upper tube alone. This upper tube supplies its power into a load whose effective impedance is just half the value of the load resistance into which the upper tube could deliver maximum power. This load impedance is inverted by the network $N_1$ into an apparent impedance of twice the value into which the upper tube could deliver maximum power. Under these conditions the peak voltage swing of the upper tube begins to approach the supply voltage just as the radio frequency input reaches a value equal to that of the unmodulated carrier. For input signals of greater magnitude than this, the upper tube, if acting alone, would begin to introduce distortion into the output. But as the input signal is increased above the value corresponding to the unmodulated carrier the lower tube comes into action and contributes in two different ways to a linear or proportional increase of the output signal. First, the lower tube acts as a class C amplifier and delivers power to the load in its own right. Second, through the action of the impedance-inverting network $N_1$, the lower tube acts in such a way as to reduce the effective load impedance as seen by the upper tube. This makes it possible for the upper tube to deliver more power to the load without an increase in its anode voltage swing.

The final result is a linear amplifier of unusually high efficiency.

The manner in which the second contribution of the lower tube operates may be explained as follows: For small signals the lower tube is substantially cut off. From the standpoint of the upper tube, its anode impedance is in parallel with the load but, since under these conditions it is substantially cut off, its output impedance is substantially infinite so that the upper tube sees only the impedance of the load. As the signal increases in magnitude so that the lower tube begins to deliver power, its output impedance commences to fall in magnitude. However, since it is delivering power to the load rather than drawing power from the load, this reduced resistance is a negative one. Thus the upper tube sees an impedance which is the combination in parallel of the negative output resistance of the lower tube, and the positive resistance of the load, which is smaller in magnitude. The effective resistance of such a combination is greater than that of the load. But by the interposition of the impedance-inverting network $N_1$ this increase in the load impedance is transformed into an apparent reduction in the load impedance as seen by the upper tube, so that the upper tube is now able to deliver more power to the load without an increase in its anode voltage.

The unavoidable phase shift of 90 degrees introduced by the impedance-inverting network $N_1$ is compensated in the Doherty amplifier by a second impedance-inverting network $N_2$. The combination of these two impedance-inverting networks $N_1$ and $N_2$ with the class B tube is in fact the dual counterpart of a class B tube working alone. Now it has been shown by R. L. Wallace Jr. in the above-mentioned patent applications that a transistor amplifier of the grounded base configuration is itself a dual counterpart of a vacuum tube of the grounded cathode configuration. This duality relation is complete with the sole exception of the fact that while the tube effects a phase reversal the transistor does not. Therefore the duality relation may be made complete by the addition of a phase-reversing transformer. Thus the combination of a transistor 5 of the grounded base configuration with a transformer 6 as shown in the box 4 in the upper branch of the circuit diagram of Fig. 2A is completely equivalent to that part of the upper branch of the circuit of Fig. 1A enclosed in the broken line box 3, while the lower branch, including the vacuum tube 7 may be identical with the lower branch of Fig. 1A, including the tube 2.

The new arrangement offers the further advantage that the inputs to the two amplifying devices are now either in phase or in phase opposition, instead of in phase quadrature, as necessitated by the network $N_2$ of the Doherty amplifier.

Figure 2A:
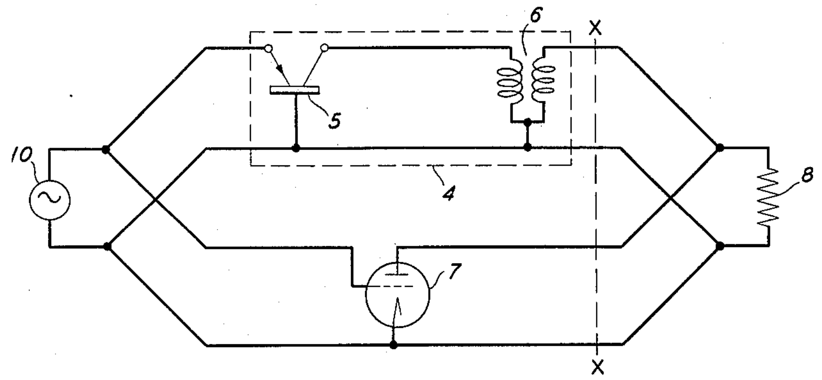
Figure 2B:
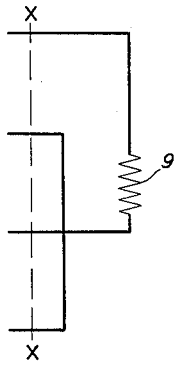
Fig. 2B illustrates the same alteration in the output circuit of Fig. 2A as does Fig. 1B for Fig. 1A.

The function of the transformer 6 in Fig. 2A is to make the total phase shift in the upper signal path such that the outputs of the two signal paths are additive in the load. If the load 8 is connected in shunt with the outputs of the two amplifiers as in Fig. 2A, the outputs of the two paths should be in phase; and if the load 9 is connected in series with the two outputs as in Fig. 2B, the outputs should be 180 degrees out of phase. Many other methods of adjusting these phase relations are available. For example, as in Fig. 3 the phase of the input to one path may be inverted by a transformer 11. Fig. 3 is otherwise the same as Fig. 2A except for the addition of plate and grid voltage supply sources 12, 13, for the tube, and collector and emitter current supply sources 14, 15 for the transistor. The latter are schematically indicated as constant current generators supplying a current $I_e$ to the emitter and a current $I_c$ to the collector. As a practical matter, appropriate combinations of batteries and resistors may be employed to replace the constant current generators. In order that the parallel between Fig. 1A and Fig. 3 may continue to hold, the tube 7 in the lower path is to be biased, as by selection of the grid bias voltage $E_g$, for class C operation while the transistor 5 in the upper path is biased, as by selection of the magnitude of the emitter biasing current $I_e$, for class B operation.

The operation of the circuit of Fig. 3 is exactly similar to that of Fig. 1 except that the transistor 5 operates as the dual of the upper tube 1, and therefore as an equivalent of the combination of the upper tube 1 with the two impedance-inverting networks $N_1$ and $N_2$. This means that the transistor 5 is given a large forward emitter bias so that its collector voltage is almost cut off. Under these circumstances it is capable of operation as a linear amplifier. The load resistance 8 is again just half of that into which the transistor 5 could deliver maximum power. The transistor acts alone to amplify input signals of the source 10 which are smaller than the unmodulated carrier while the vacuum tube 7 in the lower path is biased well below cut-off as before. As the input signal exceeds that of the unmodulated carrier the collector current of the transistor 5 begins to approach the maximum value permitted by the collector current supply source 14, and for further increases the transistor alone would deliver no increase in output but would, in effect, be saturated. However, for further increases in the input signal, the class C tube 7 in the lower path begins to contribute to the output in the two ways in which it does in the circuit of Fig. 1A. First it acts as a class C amplifier delivering power directly to the load 8; and second, it behaves as a negative resistance which is bridged across the load 8 and thereby increases the impedance into which the transistor 5 works. This increase in impedance permits the transistor to deliver an increased amount of power without calling for a corresponding increase in the collector current swing. When the input signal has attained its maximum amplitude, equal to twice the unmodulated carrier amplitude, the two amplifiers 5, 7 are delivering power to the load 8 in equal amounts, and each sees a load of optimum resistance.

Just as the Doherty amplifier requires tuned circuits for best operation, so also the apparatus of Fig. 3 can be operated with a minimum of distortion by the addition of appropriate circuits tuned to the operating frequency. Thus Fig. 4 shows such an arrangement in which a parallel tuned circuit consisting of an inductance coil 18 shunted by a condenser 19 is connected from the anode of the vacuum tube 7 to its cathode, in shunt with the load 8. Because the transistor is dual to the tube, and is most accurately regarded as a current amplifier, the appropriate tuning circuit is a series tuned combination of a coil 20 and a condenser 21 connected in series between the collector electrode of the transistor 5 and the load 8.

In Fig. 4, the windings 23—26 of the input transformer must be poled in the manner shown by the plus and minus signs on the drawing. That these are correct may be seen from the following consideration. Assume that at a given instant the signal is such as to apply positive voltage to the upper ends of the windings 23, 24 and negative voltage to the lower ends. Thus, positive voltage is applied to the emitter of the transistor 5 and negative voltage to the grid of the tube 7. The transistor produces no phase reversal, while the tube does produce such a phase reversal. Thus, the signal ouput of the transistor, applied to the right-hand end of the load resistor 8 is positive, while the signal output from the tube, applied likewise to the right-hand end of the load resistor 8, is also positive. Thus, the signals from the transistor and from the tube, respectively, are additive in the load.

The Doherty circuit of Fig. 1A is essentially a single frequency or narrow band device; and this is on account of the fact that the networks $N_1$ and $N_2$ can only be constructed by the use of reactive tuned circuit elements. This restriction, however, does not hold of the circuit of the present invention as illustrated by the fact that Fig. 3 contains no sharply tuned reactive element, and is entirely satisfactory in operation except for the distortion introduced by the failure of either of the amplifiers to translate the negative radio frequency swings of the signal. Such distortion may be to a great extent eliminated, and an entirely satisfactory broad band amplifier may be constructed, by employing a balanced pair of transistors 30, 31, connected for current push-pull operation in the upper path and a corresponding balanced pair of vacuum tubes 32, 33 connected for voltage push-pull operation in the lower path. Such an arrangement is illustrated in Fig. 5A. As before the transistors 30, 31 may be biased for class B operation and the vacuum tubes 32, 33 may be biased for class C operation. It may be noted in passing that the push-pull connections both in the input circuits and the output circuits of the two vacuum tubes are conventional, the two cathodes being connected to center taps 35, 36 of the windings of the input and output transformers 37, 38. In the case of the transistors 30, 31, on the contrary, current push-pull operation does not call for such connections. Rather, the input voltage generated in the input transformer 39 by the signal source 29 is impressed on the emitters of the two transistors 30, 31 in series while the load as reflected into the output circuit of the transistors by the output transformer 40, is connected in series between the collectors of the two transistors. It may also be noted that the signal source 29 is no longer restricted to a source of signal-modulated carrier waves. The broad band, high efficiency amplifier of Fig. 5 is adapted to translate signals whose frequency and amplitude vary widely, such as those of a sound source or a television camera.

Returning now to Fig. 1A, it has been pointed out that the class C tube 2, bridged across the load as it is from the standpoint of the class B tube 1, operates as a negative resistance in shunt with the load as seen by the class B tube 1 so that its effect is to increase the load resistance when it comes into operation; and that this increase is inverted into a reduction of the apparent load resistance as seen by the class B tube by the impedance-inverting network $N_1$. However, if the class C tube is connected in effect in series with the load then, when it is not in operation it is in effect an open circuit in series with the load, thus preventing the delivery of power to the load by the class B tube. Therefore when, as illustrated by the connections of Fig. 1B, Doherty places the output circuits of the upper and lower tubes respectively in effective series connection with the load, it is preferred to interchange the roles of the upper tube and of the lower one from the standpoint of class B operation or of class C operation. This has its full counterpart in the arrangement of the present invention as shown by Fig. 6 where the load 9 is now connected in series between the anode of the tube 7 as the output in the lower path and collector of the transistor 5 as the output in the upper path. Here, however, the transistor 5 is to be operated on a class C basis and the vacuum tube 7 is to be operated on a class B basis, by adjustment of the magnitudes of the emitter biasing current $I_e$ and of the grid biasing voltage $E_g$ respectively, in well-known manner. Furthermore the load 9 is now just twice as great as the resistance into which the tube 7 could deliver maximum power.

Still another change must be made when the series load arrangement of Fig. 6 is employed, and this change is illustrated in Fig. 6 by the plus and minus signs associated with the secondary windings of the input transformers 43, 44. That the signs as shown are correct for this arrangement may be seen as follows. Assume that at a given instant the voltage of the generator 10 is as indicated by the signs on the primary windings and that, as a result, positive signals are applied to the emitter of the transistor and to the grid of the tube. Because the transistor effects no phase reversal this produces a positive voltage at the upper end of the load resistor 9. But because the vacuum tube does produce such a phase reversal, it produces a negative signal at the lower end of the load resistor; and these two signals are therefore so arranged as to be additive in the load.

The manner in which the system of Fig. 6 operates may be best explained as follows. As stated above, it is now the vacuum tube 7 which operates as a class B amplifier, while the transistor 5 assists in handling the signal peaks by class C operation. At low input levels, the transistor behaves as a short circuit in series with the load 9, and the vacuum tube works into an impedance which is just twice the value into which it can deliver maximum power.

As the input signal increases above the level of the carrier, the transistor comes into operation, contributing in two ways to an increase in the power output. First, it delivers power directly to the load 9; and second, it behaves as a negative resistance in series with the load, thus reducing the impedance into which the vacuum tube works, and so permitting it to deliver more power without a corresponding increase in its plate voltage swing. When the input signal reaches its maximum amplitude, equal, in the case of a signal-modulated carrier input, to twice the unmodulated carrier amplitude, the two amplifiers are delivering equal powers to the load, and each sees a load of optimum resistance.

The arrangement of Fig. 6 offers the advantage that of the two amplifiers the one which is always operative is the tube, while the transistor which, at least at present, has a limited power-handling capacity, is required to operate only on signal peaks.

The unbalanced, narrow-band circuit of Fig. 6 is shown as containing two reactive circuits, one of them a parallel tuned circuit 18, 19 between the anode and cathode of the tube 7 in shunt with the load 9 and the other a series tuned circuit 20, 21 in series with the collector of the transistor 5 and with the load 9, for single frequency or narrow-band operation. As with the parallel load arrangement of the first form of the Doherty amplifier, Fig. 1A, the series load arrangement of the second form, Fig. 1B, may also be extended to wide band operation in the manner explained above in connection with Fig. 5A, and this merely by rearranging the load circuit so as to place the load in series between the two transformer output windings as shown in Fig. 5B and by interchanging the roles of the transistors 30, 31 and of the tubes 32, 33, so that the transistors shall operate on a class C basis while the tubes operate on a class B basis. As before, the windings of the input transformers 37, 39 must be poled in such a fashion as to cause the outputs of the transistors and of the tubes to be additive in the load.

Aside from its advantages in reducing distortion, in the absence of reactive circuits, by amplifying negative signal peaks as well as positive, any push-pull arrangement offers the further advantage that the amplifier pair can handle substantially twice the total power which a single amplifier of the same type can handle. Present day vacuum tubes can handle many times as much power as present day transistors, so that in some situations it may be economical to employ a push-pull pair of transistors in one path and an unbalanced vacuum tube in the other. Such an arrangement, including two transistors 30, 31, connected for current push-pull operation, is shown in Fig. 7 where because the unbalanced tube 7 requires a parallel tuned circuit 18, 19, series tuned circuits comprising coils 20 and condensers 21 are included in the transistor amplifier as well. The presence of the tuning condensers 21 requires the provision of separate bias current sources 45, 46 for the collectors of the two transistors.

Figure 8:
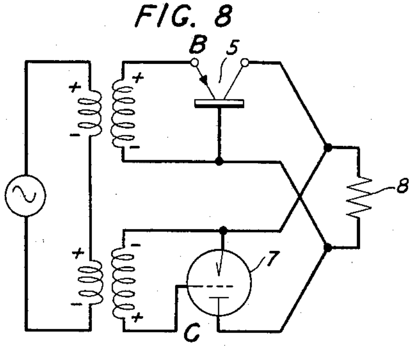

Fig. 8 shows in schematic form, with omission of voltage and current supply sources which may be included in the manner shown in other figures, an alternative to Figs. 2A and 3 in which the transistor 5 and the vacuum tube 7 are still connected in parallel, as seen by the load 8, but with a phase reversal of this load connection which may be compensated by a corresponding phase reversal at the input terminals of the system.

Figure 9:
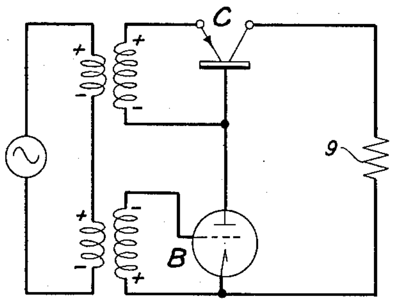

Similarly, Figs. 9, 10, and 11 show three alternatives to the series load arrangement of Fig. 6. In all of these figures, the output circuits of the two amplifiers are in series with the load 9, the differences being only in the relative locations of the load and the two amplifiers and in the poling of the inputs to the two amplifiers in such a way as to make their outputs additive in the load.

The invention may readily be extended from amplifiers to modulators in a manner analogous to the extension of the invention of the Doherty amplifier to a vacuum tube modulator, as described in Reise et al. Patent 2,226,258. Fig. 12 shows such an arrangement, an extension of Fig. 6. Thus, the load 9 is connected in series between the anode of the vacuum tube 7 and the collector of the transistor 5, the transistor being biased for class C operation and the tube for class B operation. High frequency signals derived, for example, from a single-frequency carrier source 48 may be applied by way of input transformers 43, 44 to the grid of the tube 7 and to the emitter of the transistor 5, while signals of lower frequency derived from another source 52, such as an audio frequency signal source may be applied by other transformers 50, 51 to the grid of the tube 7 and to the emitter of the transistor 5. Because of the dual relation between the characteristics of the input circuits of the transistor and of the tube it is preferred to apply this modulating signal in series with the grid of the tube and in shunt with the emitter of the transistor. It is further desirable that the modulating signal source present an impedance which is low compared with the input impedance of the tube and high compared with the input impedance of the transistor. Because of the very wide disparity between the input impedances of tubes and transistors, the first being of the order of millions of ohms and the second a few hundreds of ohms or less, a source impedance of intermediate value, such as 50,000 ohms furnishes a good approximation to this ideal in that it is small compared with the input impedance of the tube and large compared with the input impedance of the transistor.

The alternative form of the invention in which the tube and the transistor are connected in parallel from the standpoint of the load may also be extended to modulators in a manner substantially identical with the extension from the amplifier of Fig. 6 to the modulator of Fig. 12.

Still other extensions and variations of the circuits shown by way of example will occur to those skilled in the art.

From the foregoing description it can be seen that among the more significant features of the invention are the following: The amplifier in the first path is active for signals of all levels; the amplifier in the second path is active only for signals above a preassigned level and inactive for signals below that level; the amplifier in the first path is characterized by an increase in its power output when its effective termination is modified by the feeding of power from the second amplifier into the load; and the two amplifiers are connected to the load in such a way that their outputs are additive in the load. These features hold as well for the series form of the invention as for the parallel form, for broad band amplifiers and for narrow band amplifiers, for push-pull amplifiers and for single-sided ones.

It is, moreover, a consequence of the elimination of the impedance-inverting networks that the inputs to the two amplifiers may always be in phase or in phase opposition, instead of in phase quadrature as in the case of the Doherty amplifier.

What is claimed is:

1. Apparatus for translating electric signals which comprises a wave source, a load, two energy paths interconnecting said source with said load, an amplifier comprising a discharge device having a cathode, a grid and an anode in one of said paths, said amplifier having input terminals which are directly connected to said cathode and grid, respectively, and output terminals which are directly connected to said cathode and anode, respectively, an amplifier comprising a transistor having a base, an emitter and a collector in the other of said paths, said last-named amplifier having input terminals which are directly connected to said base and emitter, respectively, and output terminals which are directly connected to said base and collector, respectively, connections from the source to the input terminals of the respective amplifiers for applying to said input terminals signals of said source which differ in phase as between said amplifiers only by an integral multiple, including zero, of $\pi$ radians, connections from the output terminals of the amplifiers to the load for supplying the output signals of said amplifiers to the load in additive relation and without impedance inversion, means for biasing one of said amplifiers for class B operation, and means for biasing the other of said amplifiers for class C operation, whereby the supply of power by one of said amplifiers to the load modifies the effective output termination of the other amplifier in a sense to increase the power output of said other amplifier.

2. Apparatus as defined in claim 1 wherein the vacuum tube amplifier is of the grounded-cathode configuration and wherein the transistor amplifier is of the grounded base configuration.

3. Apparatus as defined in claim 1 wherein the collector-base circuit of the transistor and the anode-cathode circuit of the tube are connected in parallel as seen by the load.

4. Apparatus as defined in claim 3 wherein a class B current bias is applied to the transistor and a class C voltage bias is applied to the tube.

5. Apparatus as defined in claim 3 wherein the load is proportioned to one-half the resistance into which the transistor amplifier could deliver maximum power.

6. Apparatus as defined in claim 1 wherein the collector-base circuit of the transistor and the anode-cathode circuit of the tube are connected in series with the load.

7. Apparatus as defined in claim 6 wherein a class B voltage bias is applied to the tube and a class C current bias is applied to the transistor.

8. Apparatus as defined in claim 6 wherein the load is proportioned to twice the resistance into which the vacuum tube amplifier could deliver maximum power.

9. In combination with apparatus as defined in claim 1, an antiresonant tuned circuit connected in parallel with the anode-cathode circuit of the tube and a series resonant tuned circuit connected in series with the collector base circuit of the transistor.

10. Apparatus as defined in claim 1 wherein one amplifier comprises a pair of transistors connected in current push pull.

11. Apparatus as defined in claim 1 wherein one amplifier comprises a pair of vacuum tubes connected in voltage push-pull and the other amplifier comprises a pair of transistors connected in current push pull.

12. In combination with apparatus as defined in claim 1, means for applying a carrier signal to the grid of the tube and to the emitter of the transistor, a source of a modulating signal, and additional means for applying the modulating signal of said source as a voltage in series with the grid of the tube and as a current in parallel with the emitter of the transistor.

13. Apparatus as defined in claim 12 wherein the impedance of the modulating signal source is intermediate in magnitude between the input impedance of the tube and the input impedance of the transistor.

References Cited in the file of this patent

UNITED STATES PATENTS

| | | |
|---|---|---|
| 2,210,028 | Doherty | Aug. 6, 1940 |
| 2,269,518 | Chireix et al. | Jan. 13, 1942 |
| 2,524,034 | Brattain et al. | Oct. 3, 1950 |
| 2,524,035 | Bardeen et al. | Oct. 3, 1950 |
| 2,620,448 | Wallace, Jr. | Dec. 2, 1952 |